United States Patent
Egan et al.

(10) Patent No.: US 6,560,223 B1
(45) Date of Patent: May 6, 2003

(54) WIRELESS MULTI-SITE NETWORKING USING SIGNALING AND VOICE-OVER-IP

(75) Inventors: Brian Patrick Egan, Stittsville (CA); Robert Macaulay, Glouster (CA); James Mastronardi, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,232

(22) Filed: Dec. 23, 1998

(51) Int. Cl.$^7$ ............................................... H04L 12/66
(52) U.S. Cl. ...................................... 370/356; 370/338
(58) Field of Search ........................ 455/433; 370/331, 370/352, 356, 466, 270, 271, 338; 709/245

(56) References Cited

U.S. PATENT DOCUMENTS

| | | |
|---|---|---|
| 5,764,639 A | 6/1998 | Staples et al. |
| 6,141,341 A * | 10/2000 | Jones et al. ................. 370/352 |
| 6,195,705 B1 * | 2/2001 | Leung ........................ 709/245 |
| RE37,276 E * | 7/2001 | Lantto ........................ 455/433 |
| 6,292,480 B1 * | 9/2001 | May ............................ 370/352 |
| 6,327,267 B1 * | 12/2001 | Valentine et al. ........... 370/466 |

* cited by examiner

*Primary Examiner*—Hassan Kizou
*Assistant Examiner*—Afsar M. Qureshi
(74) *Attorney, Agent, or Firm*—Gibbons, Del Deo, Dolan, Griffinger & Vecchione

(57) ABSTRACT

The invention relates to methods and apparatus for wireless multi-site networking using signaling and voice over Internet protocol. The apparatus includes a wireless portable terminal, a controller for controlling communications equipment, wireless base stations, a computer network, and signaling devices. The wireless portable terminal is registered to a home controller when within a home coverage area, and the wireless portable terminal is registered with a remote controller when within a remote coverage area, thereby allowing the wireless portable terminal to roam from the home location to the remote location using a home wireless base station and remote wireless base stations, respectively, with the ability to make and receive calls via its home directory number.

17 Claims, 3 Drawing Sheets

WIRELESS MULTI-SITE NETWORKING USING SIGNALING AND VOICE-OVER-IP

BACKGROUND OF THE INVENTION

The present invention relates generally to telecommunications, and more particularly, to systems and methods for interconnecting a plurality of telecommunications systems, including mobile, home and office communications equipment.

Systems and methods for permitting communications between mobile telecommunications stations and a Local Area Network (LAN) or similar enterprise networks are known. U.S. Pat. No. 5,764,639 discusses a system to permit a remote user to maintain a "virtual presence" at a corporate office. The remote user's telephone behaves as an extension to a Private Branch Exchange (PBX), and the remote user has the ability to send and receive faxes and e-mail, access the Internet and maintain LAN connectivity substantially as if the user were present at the corporate office.

Support for end-to-end voice calls using the Internet as an alternative to traditional public switched telephone networks (PSTN) is also well known. Unlike the PSTN, which is circuit-switched, the Internet is packet-switched; communication on the Internet is accomplished by transmitting and receiving packets of "data." In addition to data, each packet contains an address to ensure that it is routed correctly. The format of these packets is defined by the Internet Protocol (IP). One type of allowable data is encoded, digitized voice. Thus, voice over IP (VOIP) is voice that is packetized as defined by IP, and communicated over the Internet for telephone-like communication. A service provider can offload branch-office voice traffic from the PSTN and route it across the company's existing data intranet, thereby eliminating toll charges. In addition, interoffice fax traffic can be routed across a company's data network or through an extranet, using existing fax machines, key systems, Centrexes, and PBXs, making the process of placing calls over the IP network transparent to users.

Wireless networks are also well known. However, conventional wireless systems do not allow full feature transparency (i.e. "virtual presence") as one changes locations in the wireless network. Portable terminals must use wireless base stations and PBXs within a local coverage area. Present wireless systems also do not allow for restricted use of an IP network. Thus the grade of service for voice cannot be engineered to customer specified quality levels. Present systems and methods do not allow a home user, to travel outside a home coverage area and still make and receive calls as though the user were still in the home coverage area. Thus the features normally associated with a home user (e.g. originating calls to other parties using the correct originating caller line identification (CLID), preserving billing and restrictions information associated with the out-going call, preserving voice mail on the home system, and the like) are not preserved. Furthermore, present systems and methods do not enable the use of wireless networks to interconnect multiple voice and signaling systems with an IP network.

Accordingly, it is an object of the present invention to use IP networks to allow multi-site roaming for mobile users.

Another object of this invention is to use IP networks for extending both the signaling information and the voice information from a home system location to a remote system location.

It is a further object of the present invention to use IP networks to enable a user at a remote location to appear as though they are making and receiving calls from their home location.

It is a further object of the present invention to preserve all of the features normally associated with a home user.

It is a further object of the present invention to use a wireless local area network (LAN) or wide area network (WAN) to interconnect multiple voice and signaling systems with an IP network, thereby allowing for very rapid installation of a multi-site networked system.

It is also an object of the present invention to use common infrastructure to network wired and wireless terminals in this network.

It is also an object of the present invention to permit multiple systems to be networked together to form one very large mobility system.

SUMMARY OF THE INVENTION

In accordance with the teachings of the present invention, these and other objects may be accomplished by the present invention which allows wireless multi-site networking using signaling and voice-over-Internet-protocol. The invention includes a wireless portable terminal that can roam from a home coverage area to a remote coverage area. The invention also includes a home controller, having a home port thereon, that is configured to control home communication equipment within the home coverage area. The invention further includes a home wireless base station coupled to the home controller, configured to transmit and receive wireless communications.

The invention includes a remote controller, having a remote port thereon, configured to control remote communications equipment within a remote coverage area. A remote wireless base station may be coupled to the remote controller, and configured to transmit and receive wireless communications.

This invention also includes a computer network. A home signaling device may be electrically coupled to the home controller and the computer network, and configured to packetize signaling and voice data from the home controller and placing the packetized data on the computer network. In addition, a remote signaling device may be electrically coupled to the remote controller and the computer network. The remote signaling device is also configured to packetize signaling and voice data from the remote controller and placing the packetized data on the computer network.

The wireless portable terminal is assigned a home directory number representing its home port on the home controller for routing communications to the wireless portable terminal to home communications equipment at the home location. The wireless portable terminal may also be assigned a registry number for registering the wireless portable terminal with the home controller when the wireless portable terminal is located in the home coverage area, and with the remote controller when the wireless portable terminal is located in the remote coverage area. Thus the wireless portable terminal is allowed to roam between the home location and the remote location using either the home wireless base station or the remote wireless base station, with the ability to make or receive calls via the home directory number.

Another embodiment of the present invention includes configuring a home controller having a home port thereon, to control home communication equipment within a home coverage area. This embodiment further includes configuring a home wireless base station coupled to the home controller, to transmit and receive wireless communications.

The embodiment also includes configuring a remote controller having a remote port thereon, to control remote communications equipment within a remote coverage area. It also includes configuring a remote wireless base station coupled to the remote controller, to transmit and receive wireless communications.

This embodiment also includes configuring a home signaling device electrically coupled to the home controller and the computer network, to packetize signaling and voice data from the home controller and placing the packetized data on the computer network.

This embodiment further includes configuring a remote signaling device electrically coupled to the remote controller and the computer network, to packetize signaling and voice data from the remote controller and placing the packetized data on a computer network. It also includes assigning a home directory number representing the home port on the home controller for routing communications from the wireless portable terminal to the home communications equipment at the home location. In addition, this embodiment includes assigning a registry number to the portable terminal for registering the wireless portable terminal with the home controller when the wireless portable terminal is located in the home coverage area, and for registering the wireless portable terminal with the remote controller when the wireless portable terminal is located in the remote coverage area. Thus, the wireless portable terminal is allowed to roam between the home location and the remote location using the home wireless base station and the remote wireless base station, with the ability to make and receive calls via said home directory number.

Another embodiment of this invention includes a home controller device having a home port thereon, for controlling a plurality of home communication equipment within a home coverage area. A home wireless base station device can be coupled to the home controller device, for transmitting and receiving wireless communications. This embodiment also includes a remote controller device having a remote port thereon, for controlling remote communications equipment within a remote coverage area. It further includes a remote wireless base station device coupled to the remote controller device, for transmitting and receiving wireless communications. A home signaling device is electrically coupled to the home controller device and the computer network, for packetizing signaling and voice data from the home controller device and placing the packetized data on the computer network. In addition this embodiment includes a remote signaling device electrically coupled to the remote controller device and the computer network, for packetizing signaling and voice data from the remote controller device and placing the packetized data on the computer network.

A device for assigning a home directory number, representing the home port on the home controller device, is also included, for routing communications from the wireless portable terminal to the home communications equipment at the home location. A device for assigning a registry number, to the portable terminal means, for registering the wireless portable terminal with the home controller device when the wireless portable terminal is located in the home coverage area, and for registering the wireless portable terminal with the remote controller device when the wireless portable terminal is located in the remote coverage area is also included. Thus, the wireless portable terminal is allowed to roam between the home location and the remote location using the home wireless base station device and the remote wireless base station device, with the ability to make and receive calls via the home directory number.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION

The present invention is a communication system which enables a portable terminal (e.g. mobile subscriber) to travel from a home location to a remote location, while maintaining the appearance of being within the confines of the home location. Even when the user travels outside the home location (coverage area), the system employs the home communication equipment ("home mobility system") and enables the user to make and receive calls as though still within the home location.

The present invention includes intelligent locating equipment for locating the portable terminal. It also employs an IP network or some other packet switched network to extend both the signaling information (e.g. call setup information) and the voice information from the home mobility system to a remote mobility system. By extending this information to the remote mobility system, features normally associated with a home user (e.g. originating calls to other parties, using the home originating CLID, preserving billing and restrictions information associated with out-going calls, receiving Voice mail on the home system, and the like) are preserved. The invention extends this information using wired or wireless IP local area networks (LAN) to interconnect multiple mobility systems. This architecture enables rapid installation of multi-site systems. This system is also compatible with wired terminals.

Figure 1:
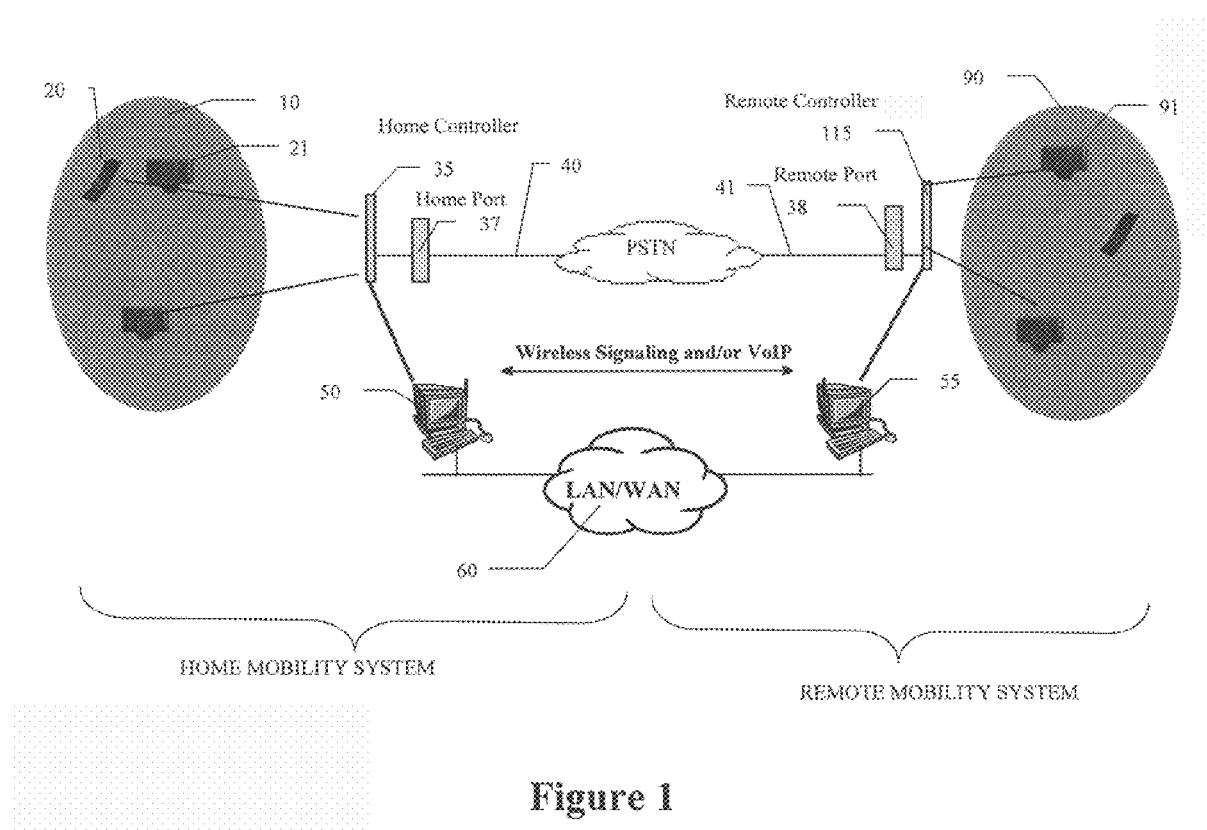
FIG. 1 is a diagram illustrating an embodiment of the present invention.

FIG. 1 shows an embodiment of the present invention. This embodiment includes a home controller 35 for controlling communication devices within the system. The home controller 35 may be an electronics card electrically connected to a network backplane. It may also be connected to the telephone companies (TelCo) switch (e.g. public branch exchange PBX) and/or a proprietary line switch (e.g. leased line) 37.

The embodiment includes a home signaling device 50 for receiving/transmitting signaling messages over an IP network 60. Signaling messages are the information packets used to communicate telephony signals from a home mobility system to a remote mobility system. Telephony signals include calling information (e.g. setup information), answering information and the like. The signaling messages are transmitted within a mobility system using the home signaling device 50 and a remote signaling device 55. The signaling devices 50, 55 include a monitoring card (not shown) for monitoring the signals on the home controller 35. When a signaling message is directed to a remote signaling device 55 the home signaling device 50 wraps the signaling message into an IP packet and transmits it over the network 60.

Each signaling device wraps (i.e. tunnels) information into an IP packet and sends the packet over the network 60. The signaling devices may also send information as part of an intelligent location feature, which includes the mobile terminal's location information. The signaling devices may also receive or transmit voice via the IP network 60. This is accomplished by a digital voice card (not shown) included in the signaling devices 55, 60. The voice message from a base station, a wired terminal, or a telephone switch is sent to the voice card in the signaling device, via the controller, and the digital voice card packetizes the voice message and the signaling device sends it over the network 60. The digital voice card may be capable of handling multiple voice channels (e.g. 32 voice channels, etc.). The number of voice channels are not limited to the voice card because the voice card can be expanded to carry more voice channels. In addition multiple cards may be connected to the signaling device, thereby expanding voice capabilities. The signaling device, monitoring card, and the digital voice card may be a single card attached to the backplane of the network or they may be separate cards. The network may be a local or wide area network (LAN/WAN) using T1, E1, ISDN or other link protocol.

Each portable terminal 20 is initially registered to its home controller 35 and is assigned a directory number (DN) or "line". Calls to the portable terminal's DN will be controlled by its home controller 35. For example, a call to the portable terminal 20 will be tested with the home controller 35 to determine if the portable terminal is registered within the home coverage area 10. If the portable terminal is registered within the home coverage area 10, the controller will make the connection via the home base station 80.

When the portable terminal 20 roams to a remote coverage area 90 controlled by remote controller 115, the home mobility system and the remote mobility system will verify and authenticate the portable terminal 20 with the home mobility controller 35. Each mobility system includes one or more wireless base stations 21, 91 for use with portable terminals within its coverage area. Each mobility system sends a beacon signal from its base stations for registering portable terminals. The portable terminal uses the beacon signal to determine whether it is within its home area or whether it has relocated. If the portable terminal 20, determines that it has relocated to a remote coverage area 90, it signals the remote controller 115 (via a remote base station 91) with information regarding its home mobility system. The remote controller 115 then sends this registration information to a remote signaling device 55. The remote signaling device 55 wraps the signaling information into IP and sends the packet to the portable terminal's home mobility system. At the home mobility system the message is unwrapped at the home signaling device 50, then sent to the home controller 35 as part of the intelligent location feature (i.e. the ability to locate a portable terminal within any mobility system).

An embodiment of this invention uses signaling over both the network and the PSTN. When an incoming call is delivered to the portable terminal's home controller 35 (i.e. someone is calling the users home DN), the call is extended to the remote controller 115 so the portable terminal 20 can answer the call. The portable terminal is provided with its full feature set from its home controller 35. As the call is being received by the home controller, a home tie line 40, from the portable terminal's home port 37, is set up. Simultaneously with the tie line setup, the home controller 35 sends a signaling message to the home signaling device 50, which in turn wraps the message into IP and sends the signaling message to the remote signaling device 55. The remote signaling device 55 unwraps the signaling message (i.e. removes the data from the IP packet), and sends signaling information to the remote controller 115, which in-turn sends the message to the portable terminal. Simultaneously with sending the signaling message to the portable terminal, the remote controller 115 sets up a remote tie line 41, to a remote port 38, for the call connection. The portable terminal then initiates a call answer by sending an "answer" signaling message to the remote controller 115. The signaling message is sent to the remote signaling device 55, which sends the signaling message to the home signaling device 50. The home signaling device 50 sends the (answer) signal to the home controller 35 which connects the call.

When a portable terminal 20 originates a call from a remote mobility system 110, the call is extended from the remote controller 115 over the IP network 60 to the home controller 35 and out the portable terminal's line connected to the home controller 35. When a portable terminal 20 dials a number, the remote controller 115 simultaneously sets up a remote tie line 41 to a remote port 38 and sends the signaling information (including relevant information to set up the call) to the users home mobility system, via the remote and home signaling devices 50, 55. The home controller 35 (after receiving the message from the home signaling device 50) sets up a call from the portable terminals DN line 37 (i.e. home port) and a call is established. Thus, the present invention permits extension of node signaling and trunking between multiple unconnected/connected mobility systems to provide for "seamless" multi-site mobility.

Another embodiment of the present invention uses the IP Network to transmit signaling and voice information using only the IP network (i.e. eliminating the use of a PSTN). This enables rapid installation of a mobility system into a multi-site network. The IP network between the different system locations could be made to be entirely wireless (using Wireless LAN technology) or a combination of wireless and wired LAN configurations. Additionally, those skilled in the art will appreciate that the voice channels may be carried over either the IP network or the PSTN. Thus there may be a portable terminal using the network for both signaling and VOIP, while another portable terminal uses the network for signaling and the PSTN for the voice channel. This invention provides for using the VOIP network or PSTN depending on the quality of Service (QoS) metrics in the network.

When a user has gone out of range (e.g. left all coverage areas) or has the handset switched off, the system may run an intelligent "locator" algorithm to attempt to locate it. If the user has not gone out of range and the handset is switched on it will locally register with the system and this registration message is seen by the locator. If this information goes stale (i.e. no more updates for a predetermined time period), then the locator could run a background task to setup a silent link with the portable terminal to identify if it is still in its last location. If the portable terminal does not respond, then the locator will know that the portable has gone out of range or is turned off. When it re-appears in the network the portable will automatically re-register with the system thereby re-establishing its where-about in the network. If a call was originated to a portable terminal when the system has determined that it is missing then the home mobility system would not attempt to locate the portable saving valuable network and radio resources.

The architecture of the present invention allows multiple mobility systems to be networked together to form one large mobility system. This permits full feature transparency as one roams about the mobility network. This technique could be used to enlarge a single controller capacity to a much larger capacity. The IP network 60 could be wireless, thus allowing "private" and restricted use of the IP network, and allowing the grade of service for the voice to be engineered to customer-specified quality levels.

Figure 2:
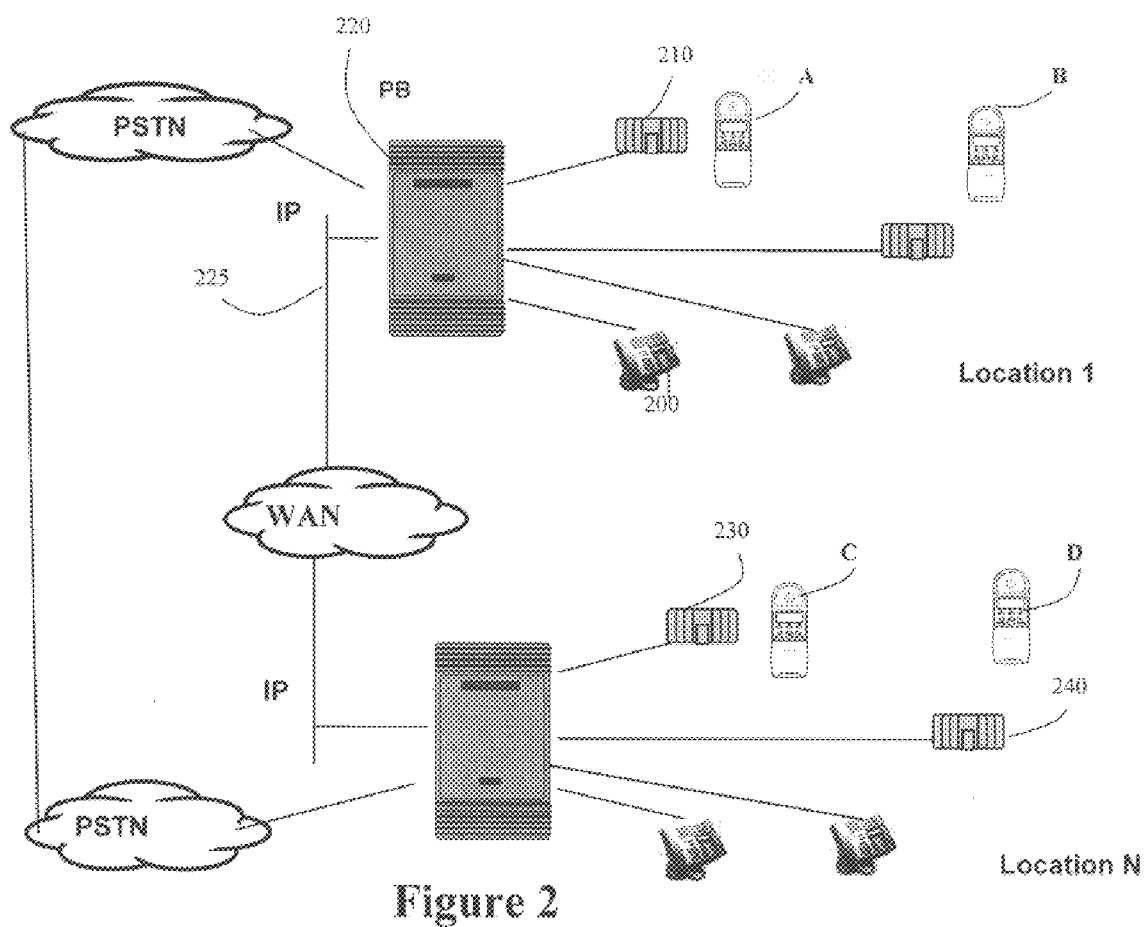
FIG. 2 is another more comprehensive diagram illustrating an embodiment of the present invention.

As shown in FIG. 2, additional communications equipment may be connected to expand the system. Thus, if wired phone 200 calls a mobile phone A, and mobile phone A is within the coverage area of its home base transmitter 210, the PBX within structure 220, will connect them. However, if wired phone 200 is calling mobile phone A, and mobile phone A is within the coverage area of C's base station 230, the same signaling and connection will occur as described above. Not shown are the signaling devices, controllers, PBXs as described above because they may be incorporated as separate units or within the same structure (i.e. on the same backplane).

Figure 3:
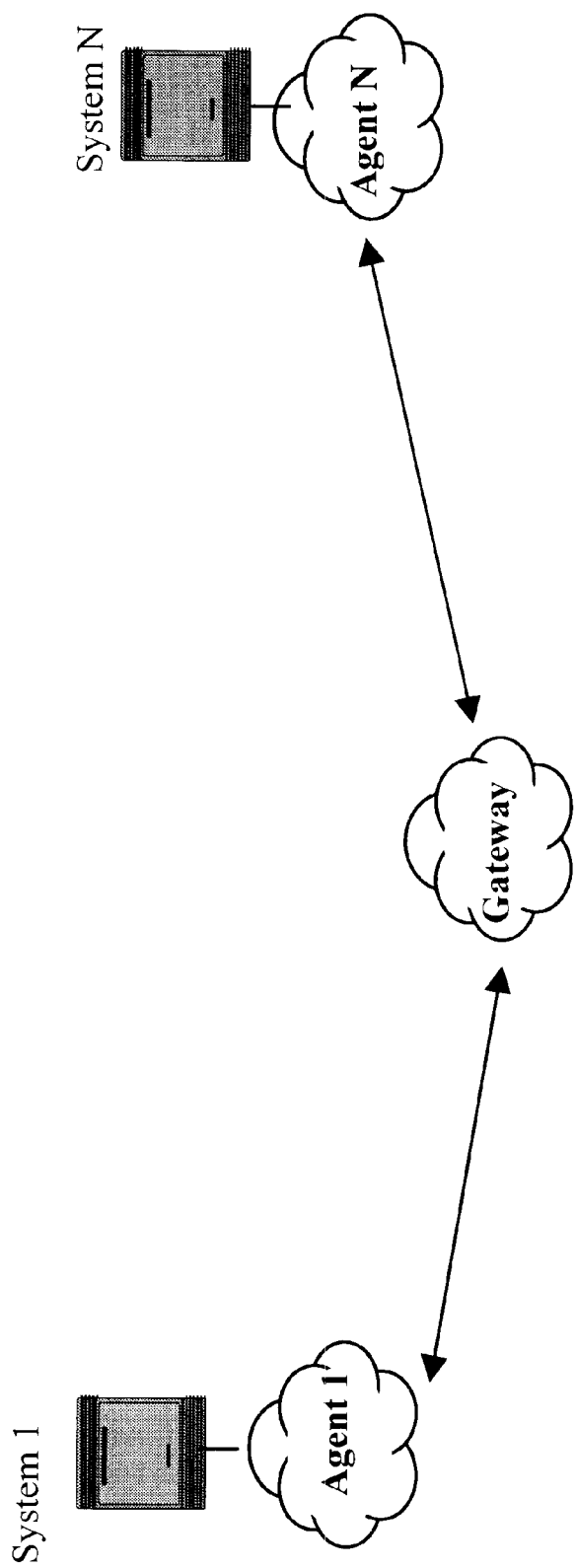
FIG. 3 is a diagram illustrating a logical architecture of the present invention.

FIG. 3 shows multiple PBX, Centrexes and/or Key systems connected together using an IP network. Using a monitoring port (agent) on each system, appropriate messaging is centrally managed using a logical entity called a "gateway". Each node in the network is configured with an agent which intelligently filters unwanted messages and forwards relevant messages to the gateway.

FIG. 3 thus illustrates a logical architecture of the present invention. The agents and gateway are all interconnected using an IP network. When a mobile user from System 1 "roams" within the coverage area of system N, the agent in system N will automatically request an authentication from the gateway, which has knowledge of every valid user on the system. The gateway authenticates the user which is then allowed to make and receive calls in that system. When an incoming call is delivered to a mobile user it is always presented to his "home" location. The gateway will then use the IP network to extend the call into the remote system. When the mobile user answers the call the voice path is managed by the gateway. The voice path may be a VOIP connection or a PSTN connection. The voice path may also dynamically change depending on the quality of service of the IP network.

When a mobile user in a remote location wishes to make a call the gateway will extend the mobile user's connectivity to their home location, i.e. when the mobile user presses the button on the handset for dial tone or dials digits and presses the send button, the gateway will create a connection using the IP network so that the mobile user selects their "home" line interface. All digits and interfacing to the network is done through the mobile users home interface.

An option in the configuration could allow the user to get local service at the remote location. For instance, if mobile user A (FIG. 2, 205) is connecting to mobile user C, while within the coverage area of C's base transmitter (FIG. 2, 230) this invention may permit the base stations to intelligently connect mobile user A and C. Thus, those skilled in the art will appreciate that if mobile user A is in location D and wishes to communicate with user C, the remote communications system may be configured to route the call. In addition, this invention allows a remote user A, while within a remote location area (i.e. FIG. 2, coverage area covered by base stations 230, and 240), and with permission, to use the remote communication system's PBX to make calls, thereby bypassing signaling and communicating via the mobile traveler's home communications system.

It will thus be seen that the invention efficiently attains the objects set forth above, among those made apparent from the preceding description. In particular, the invention provides systems and methods of networking mobility systems using signaling and voice-over-IP networks.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween. Having described the invention, What is claimed as new and secured by Letters Patent is:

1. A wireless multi-site networking system using signaling and voice-over-Internet-protocol (VOIP), comprising:
   a wireless portable terminal;
   a home controller, having a home port thereon, configured to control a plurality of home communication equipment within a home coverage area;
   a home wireless base station coupled to said home controller, configured to transmit and receive wireless communications;
   a remote controller, having a remote port thereon, configured to control a plurality of remote communications equipment within a remote coverage area;

a remote wireless base station coupled to said remote controller, configured to transmit and receive wireless communications;

a computer network;

a home signaling device in communication with said home controller and said computer network, configured to packetize signaling and voice data from said home controller and placing said packetized data on said computer network;

a remote signaling device in communication with said remote controller and said computer network, configured to packetize signaling and voice data from said remote controller and placing said packetized data on said computer network;

wherein said wireless portable terminal is assigned a home directory number representing said home port on said home controller for routing communications from said wireless portable terminal to said plurality of home communications equipment at said home location; and wherein said wireless portable terminal is assigned a registry number for registering said wireless portable terminal with said home controller when said wireless portable terminal is located in said home coverage area, and for registering said wireless portable terminal with said remote controller when said wireless portable terminal is located in said remote coverage area, thereby allowing said wireless portable terminal to roam between said home location and said remote location using said home wireless base station and said remote wireless base station, with the ability to make and receive calls via said home directory number.

2. A wireless multi-site networking system according to claim 1, wherein said packetized data includes signaling and voice data and wherein said computer network is an Internet Protocol network.

3. A wireless multi-site networking system according to claim 1, wherein said packetized data includes signaling data, and wherein said home and remote signaling devices are configured to transmit voice data via a public switched telephone network.

4. A wireless multi-site networking system according to claim 1, further comprising:

a voice mail system in communication with said controller for storing at least one message when said wireless portable terminal is out of range from said home wireless base station and out of range from said remote wireless base station.

5. A wireless multi-site networking system according to claim 1, further comprising:

home wired terminals in communication with said home controller;

remote wired terminals in communication with said remote controller;

a home private branch exchange coupled to said home controller; and a remote private branch exchange coupled to said remote controller.

6. A wireless multi-site networking system according to claim 1, wherein said signaling devices further comprise:

a computer coupled to said network;

a monitoring device coupled to said computer, configured to monitor said controllers; and at least one digital voice card coupled to said computer configured to packetize voice data.

7. A method for wireless portable terminal multi-site roaming, comprising:

configuring a home controller having a home port thereon, to control a plurality of home communication equipment within a home coverage area;

configuring a home wireless base station coupled to said home controller, to transmit and receive wireless communications;

configuring a remote controller having a remote port thereon, to control a plurality of remote communications equipment within a remote coverage area;

configuring a remote wireless base station coupled to said remote controller, to transmit and receive wireless communications;

configuring a home signaling device in communication with said home controller and a computer network, to packetize data from said home controller and placing said packetized data on said computer network;

configuring a remote signaling device in communication with said remote controller and said computer network, to packetize data from said remote controller and placing said packetized data on a computer network;

assigning a home directory number representing said home port on said home controller for routing communications from said wireless portable terminal to said plurality of home communications equipment at said home location; and assigning a registry number to said portable terminal for registering said wireless portable terminal with said home controller when said wireless portable terminal is located in said home coverage area, and for registering said wireless portable terminal with said remote controller when said wireless portable terminal is located in said remote coverage area, thereby allowing said wireless portable terminal to roam between said home location and said remote location using said home wireless base station and said remote wireless base station, with the ability to make and receive calls via said home directory number.

8. A method according to claim 7, wherein said packetized data includes signaling and voice data and wherein said computer network is an Internet Protocol network.

9. A method according to claim 7, wherein said packetized data includes signaling data and further comprising and configuring said home and remote signaling devices to transmit said voice data via a public switched telephone network.

10. A method according to claim 7, further comprising:

receiving calls and storing at least one message on a voice mail system in communication with said controller when said wireless portable terminal is out of range from said home wireless base station and said remote wireless base station.

11. A method according to claim 7, further comprising:

coupling wired home terminals to said home controller; and coupling wired remote terminals to said remote controller.

12. A method according to claim 7, wherein said signaling devices further comprise:

a computer; and a monitoring device coupled to said computer, configured to monitor said controllers; and at least one digital voice card coupled to said computer configured to packetize voice data.

13. An apparatus for wireless portable terminal multi-site roaming, comprising:

a home controller means having a home port thereon, for controlling a plurality of home communication equipment within a home coverage area;

home wireless base station means coupled to said home controller means, for transmitting and receiving wireless communications;

remote controller means having a remote port thereon, for controlling a plurality of remote communications equipment within a remote coverage area;

remote wireless base station means coupled to said remote controller means, for transmitting and receiving wireless communications;

home signaling means in communication with said home controller means and a computer network, for packetizing data from said home controller means and placing said packetized data on said computer network;

remote signaling means in communication with said remote controller means and said computer network, for packetizing data from said remote controller means and placing said packetized data on said computer network;

means for assigning a home directory number, representing said home port on said home controller means, for routing communications from said wireless portable terminal to said plurality of home communications equipment at said home location; and means for assigning a registry number, to said portable terminal means, for registering said wireless portable terminal with said home controller means when said wireless portable terminal is located in said home coverage area, and for registering said wireless portable terminal with said remote controller means when said wireless portable terminal is located in said remote coverage area, thereby allowing said wireless portable terminal to roam between said home location and said remote location using said home wireless base station means and said remote wireless base station means, with the ability to make and receive calls via said home directory number.

14. An apparatus according to claim 13, wherein said voice data is transmitted via a public switched telephone network.

15. An apparatus according to claim 13, further comprising:

voice mail means electrically coupled to said controller means for storing at least one message when said portable terminal means is out of range from said home wireless base station means and said remote wireless base station means.

16. An apparatus according to claim 13, further comprising:

wired home terminal means, electrically coupled to said home controller means, for wired communications to said home controller; and wired remote terminal means electrically coupled to said remote controller means, for wired communications to said home controller.

17. An apparatus according to claim 13, wherein said signaling devices further comprise:

computer means for connecting to said network and controlling signaling;

monitoring means coupled to said computer for monitoring said controller means; and voice packetizing means coupled to said computer for packetizing voice data.

* * * * *